(12) United States Patent
Davidson et al.

(10) Patent No.: US 8,869,416 B2
(45) Date of Patent: Oct. 28, 2014

(54) MEASURING METHOD AND SYSTEM

(71) Applicant: General Electric Company, Schenectadey, NY (US)

(72) Inventors: Paul Howard Davidson, Albany, NY (US); Jean-Marie Georges Joseph Deschamps, Poissy (FR); Michael Wayne Rankin, Princeville, IL (US)

(73) Assignee: General Electric Company, Schenectady, NY (US)

( * ) Notice: Subject to any disclaimer, the term of this patent is extended or adjusted under 35 U.S.C. 154(b) by 174 days.

(21) Appl. No.: 13/629,759

(22) Filed: Sep. 28, 2012

(65) Prior Publication Data

US 2014/0090262 A1    Apr. 3, 2014

(51) Int. Cl.
*G01B 3/00* (2006.01)
*G01B 5/00* (2006.01)
*G01B 1/00* (2006.01)

(52) U.S. Cl.
USPC .............. 33/550; 33/543; 33/556; 33/613; 33/614

(58) Field of Classification Search
USPC ............................. 33/543, 550, 613, 556, 614
See application file for complete search history.

(56) References Cited

U.S. PATENT DOCUMENTS

| 4,087,918 | A | * | 5/1978 | Schmid et al. ................. 33/542 |
| 4,190,961 | A |   | 3/1980 | James et al. |
| 4,395,827 | A | * | 8/1983 | Stowe et al. .................... 33/655 |
| 5,293,695 | A | * | 3/1994 | Olshefsky ....................... 33/783 |
| 6,486,487 | B2 |  | 11/2002 | Johnson et al. |
| 6,839,979 | B1 |  | 1/2005 | Godbole et al. |
| 2004/0083024 | A1 | * | 4/2004 | Wang ............................ 700/195 |

* cited by examiner

*Primary Examiner* — Peter Macchiarolo
*Assistant Examiner* — Rhyan C Lange
(74) *Attorney, Agent, or Firm* — James W. Pemrick; Ernest G. Cuswick; Frank A. Landgraff

(57) ABSTRACT

A system and method for measuring concentricity between a first component and a second component is provided. The system includes a fixture having a first spring element and a second spring element. The first spring element is configured to apply force in an orthogonal direction to the second spring element. A sensor is mounted to the fixture, and the sensor is configured to measure a distance to the second component. The fixture is configured to slide substantially inside a groove of the first component.

17 Claims, 4 Drawing Sheets

MEASURING METHOD AND SYSTEM

BACKGROUND OF THE INVENTION

The invention described herein relates generally to a measuring method and system. More specifically, the invention relates to a measuring method and system for measuring a gap between a rotor and a diaphragm.

For a turbine to operate efficiently, during its assembly or overhaul, it is required that its rotor be concentric with the stator. This is because between each row of the turbine blades, a packing gland or seal has to be carefully positioned to prevent steam from escaping. The packing gland consists of a labyrinth seal generally made of brass or copper and has a number of teeth that protrude from the stator housing which enter into grooves cut into the rotor shaft. The packing gland is fitted to the stator and held in place with a so-called "T" slot construction. To operate, it is essential that the rotor be concentrically disposed within the stator diaphragm, and the packing gland be concentric to the grooves in the rotor.

It is often desired to measure the concentricity of the rotor and stator with the rotor left in place. A disadvantage to this approach is that the small radial clearances between the rotor and stator diaphragm do not allow for the measurements to be taken manually due to the lack of access and constrained space. Furthermore, the small axial and radial size of the groove in the diaphragm with the minimal radial clearances between the rotor and diaphragm do not permit current known devices to be used for concentricity measurements.

BRIEF DESCRIPTION OF THE INVENTION

In an aspect of the present invention, a system for measuring concentricity between a first component (e.g., a stator diaphragm) and a second component (e.g., a rotor) is provided. The system includes a fixture having a first spring element and a second spring element. The first spring element is configured to apply force in an orthogonal direction to the second spring element. A sensor is mounted to the fixture, and the sensor is configured to measure a distance to the second component (e.g., rotor). The fixture is configured to slide substantially inside a groove of the first component (e.g., stator diaphragm).

In another aspect of the present invention, a method is provided for measuring concentricity between a first component and a second component. The first component has an inner circumferential groove. The method includes the steps of positioning a fixture containing a sensor substantially within the inner circumferential groove, and obtaining a distance measurement from the sensor, the distance measurement relating to a distance between the sensor and the second component. The positioning step and the obtaining step are repeated a predetermined number of times, and a plurality of distance measurements obtained at different locations along the inner circumferential groove are used to determine the concentricity of the first component and the second component.

In yet another aspect of the present invention, a method is provided for measuring concentricity between a stator diaphragm and a rotor. The stator diaphragm has an inner circumferential groove. The method includes the steps of positioning a fixture containing a sensor substantially within the inner circumferential groove, and obtaining a distance measurement from the sensor. The distance measurement relates to a distance between the sensor and the rotor. The positioning step and the obtaining step are repeated a predetermined number of times, and a plurality of distance measurements obtained at different locations along the inner circumferential groove are used to determine the concentricity of the stator diaphragm and the rotor.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
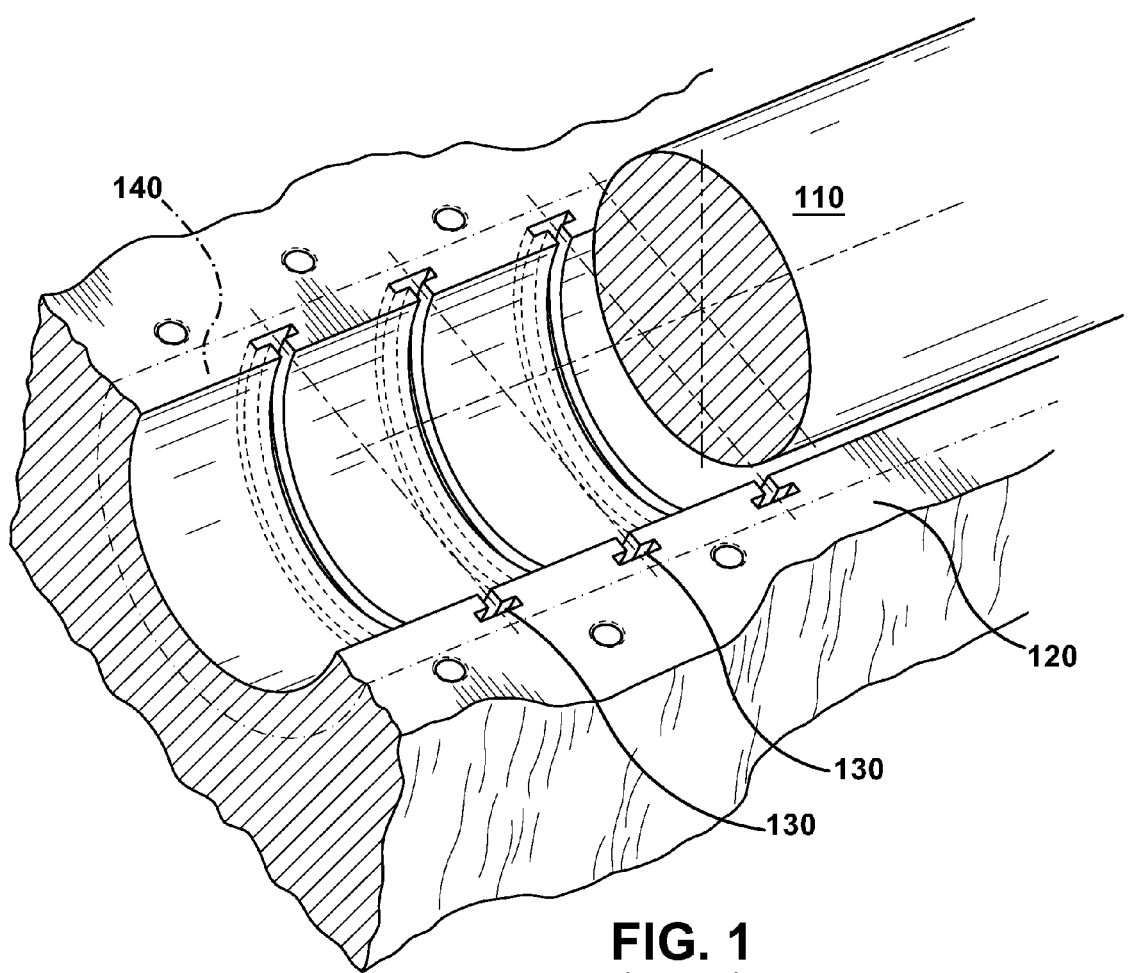
FIG. 1 is a perspective illustration of one known turbine having its upper stator housing removed for clarity.

FIG. 1 is a perspective illustration of one known turbine having its upper stator housing removed for clarity. The turbine blades/vanes are not shown for the sake of clarity. As shown, the rotor (or the turbine shaft) 110 is positioned within the stator housing 120. For efficient operation, rotor 110 must be positioned concentrically relative to the inner circumferential surface (or diaphragm) of stator housing 120. As is well known, there are a plurality of "T" slots 130, in stator housing 120. Packing rings are fitted within T slots 130 when the turbine is in operation. The T slots 130 may also be referred to as brush seal grooves 130, and in this variation the grooves 130 would be used to retain brush seals (not shown). T slots 130 are one known configuration for slots, however the present invention may also be used with "L" or "J" slots or grooves as well. The "T", "J" and "L" refer to the general cross-sectional shape of the slot or groove. In some applications the stator may include a stator diaphragm 140 (shown in phantom), which nests inside the stator housing 120. In this variation, the stator diaphragm includes grooves 130. Axis 112 illustrates an origin (or center point) of the rotor 110 and/or diaphragm 140.

Figure 2:
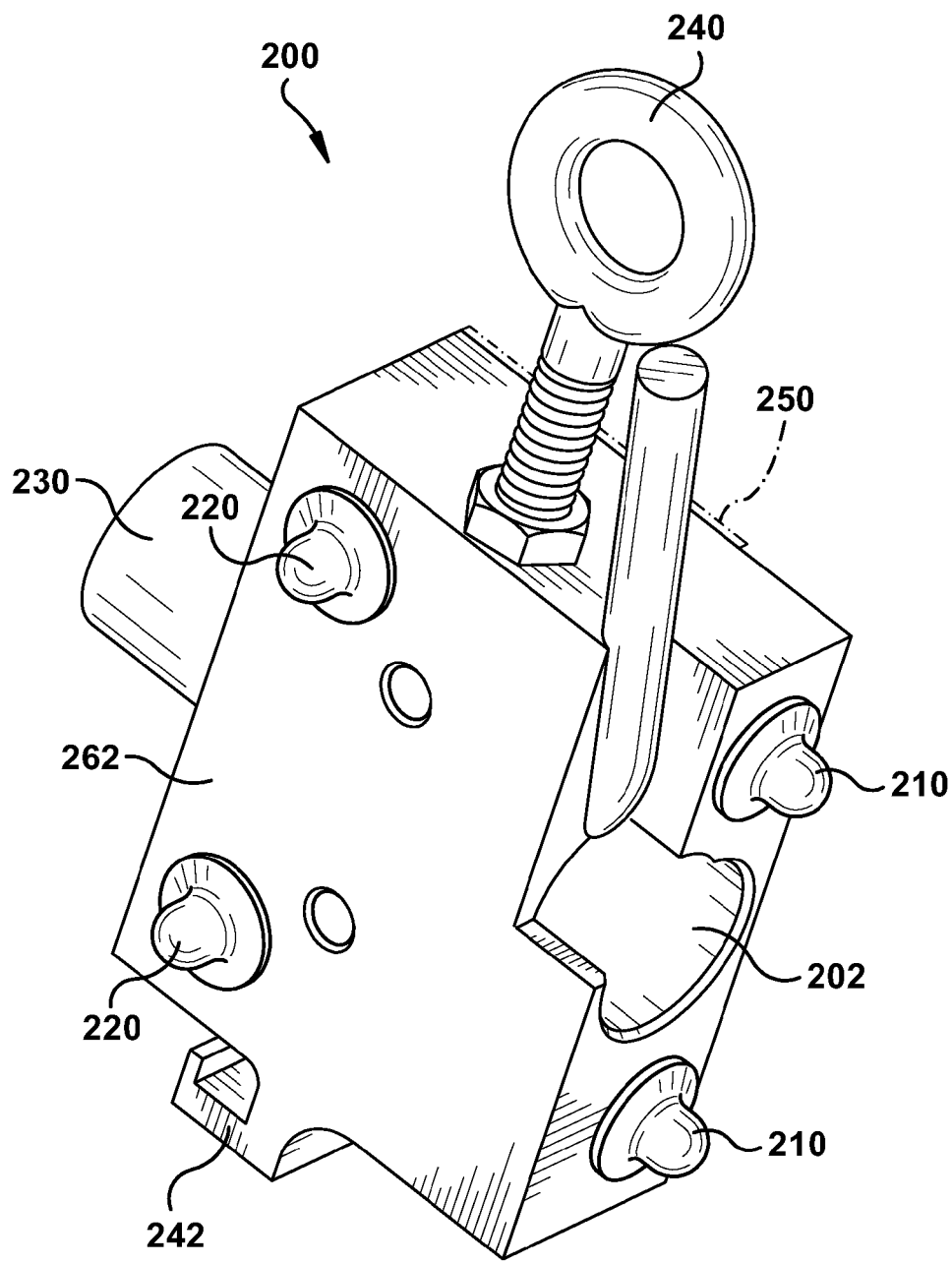
FIG. 2 is an isometric illustration of a fixture, according to an aspect of the present invention.

FIG. 2 is an isometric illustration of a fixture 200, according to an aspect of the present invention. The fixture 200 is part of a system for measuring concentricity between the diaphragm 140 (e.g., first component) and rotor 110 (e.g., second component). The fixture 200 includes a first spring element 210 and a second spring element 220. The first spring element 210 is configured to apply force in an orthogonal direction to the second spring element 220. For example, the first spring element 210 is configured to apply force in a radial direction relative to an origin of the diaphragm, and the second spring element 220 is configured to apply force in an axial direction relative to the diaphragm. As shown, the first spring element 210 and the second spring element 220 may be comprised of two individual spring elements. During a measuring operation, the first spring element 210 and the second spring element 220 are configured to contact inner surfaces of the groove 130, and the fixture 200 is configured to slide substantially inside the groove 130 of diaphragm 140.

Fixture 200 is used to retain and support a sensor 230 that is mounted to the fixture 200. The sensor 230 is configured to measure a distance to the rotor 110. The sensor 230 could be a linear variable differential transformer (LVDT) sensor, or a non-contact type sensor, such as a laser distance sensor, laser displacement sensor, inductive distance sensor or inductive displacement sensor. It is to be understood that sensor 230 could be any suitable contact type or non-contact type sensor, as desired in the specific application. The sensor 230 is mounted to the fixture 200 in a radially adjustable mount so that a radial position, relative to a surface of the diaphragm, of the sensor may be adjusted. For example, the radially adjustable mount could be comprised of a threaded interface between the sensor 230 and the fixture 200. In this aspect, the internal passage 202 of the fixture 200 would be threaded and the external longitudinal surface of the sensor 230 would also be threaded. In this manner, the sensor 230 could be screwed along the passage 230 to a desired location. As an alternative, the radial adjustment of sensor 230 could also be performed by the placement of shims behind (or under) the sensor 230, or any other suitable radial adjustment method as desired in the specific application.

In addition, the fixture 200 may include two pull attachment mounts 240 and 242, where each pull attachment mount is located on an opposing end of the fixture 200. As a non-limiting example only, the pull attachment mount 240 may be used to fasten a pull wire or cable to the fixture, and the pull attachment mount 242 may be used to attach a measuring tape to the fixture 200. As an alternative to using a measuring tape on one side, an indicated wire or wire spool with encoder could be used to determine the location of the fixture 200 circumferentially. The fixture 200 may also optionally include a low friction material 250 disposed on one or both surfaces of the fixture that are opposed to the spring elements 210, 220. The low friction material may be polytetrafluoroethylene (PTFE), perfluoroalkoxy (PFA), fluorinated ethylene propylene (FEP), or any other suitable low friction material or coating as desired in the specific application. For example, low friction material 250 may be on the surface that is generally opposed (or on the opposite side of) the second spring element 220 (i.e., opposite surface 262), and/or low friction material 250 may be on all or a portion of pins 360 (described hereinafter). Low friction material 250 may also be placed on the contact points of spring elements 210 and 220 if desired.

Figure 3:
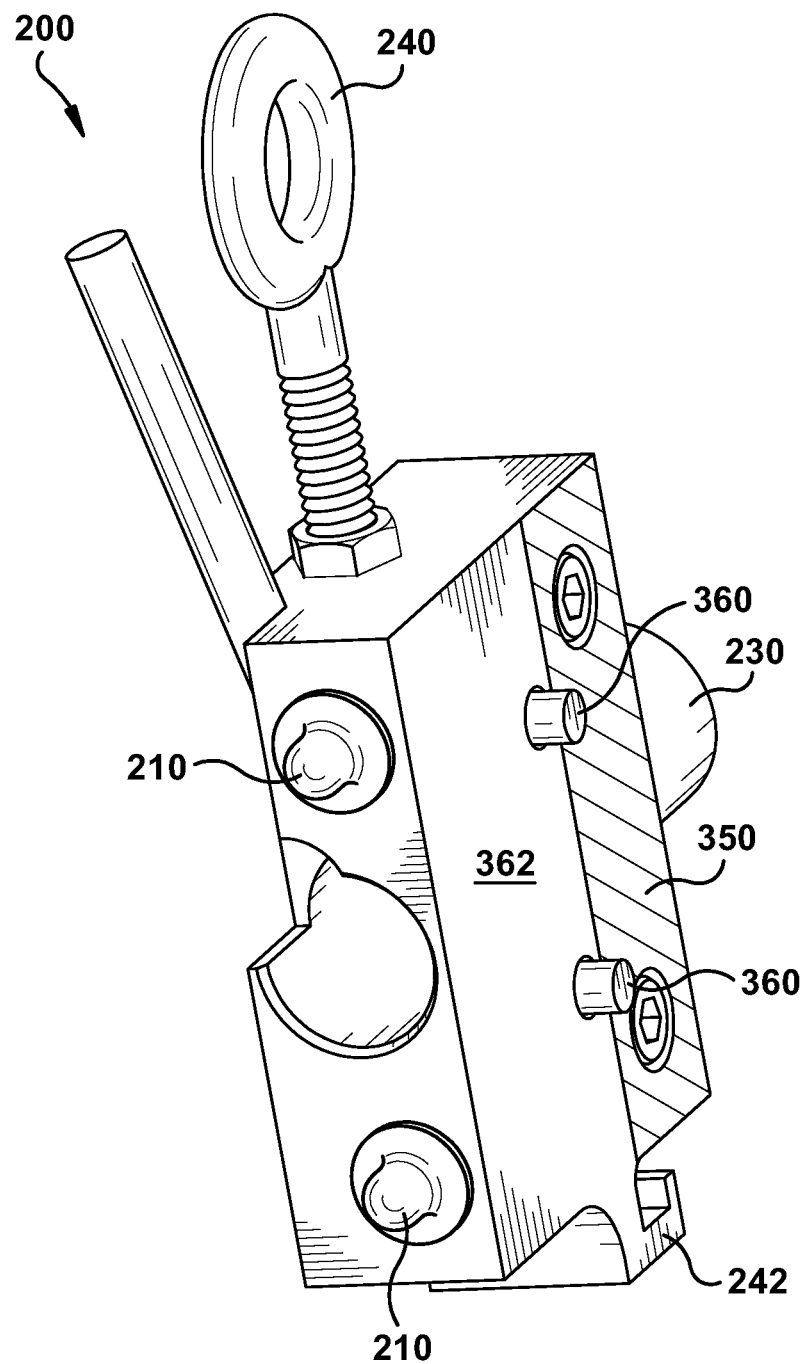
FIG. 3 illustrates an isometric view of an opposing side of the fixture, relative to the view shown in FIG. 2, and according to an aspect of the present invention.

FIG. 3 illustrates an isometric view of an opposing side of fixture 200, relative to the view shown in FIG. 2. The fixture 200 also includes one or more (two are shown) hook fit reference pins 360 that project outwardly from surface 362. The pins 360 are used for support and bear against the hook fit portion of groove 130. Low friction material 350 may also be disposed on surface 362 to reduce friction as the fixture 200 slides along groove 130.

Figure 4:
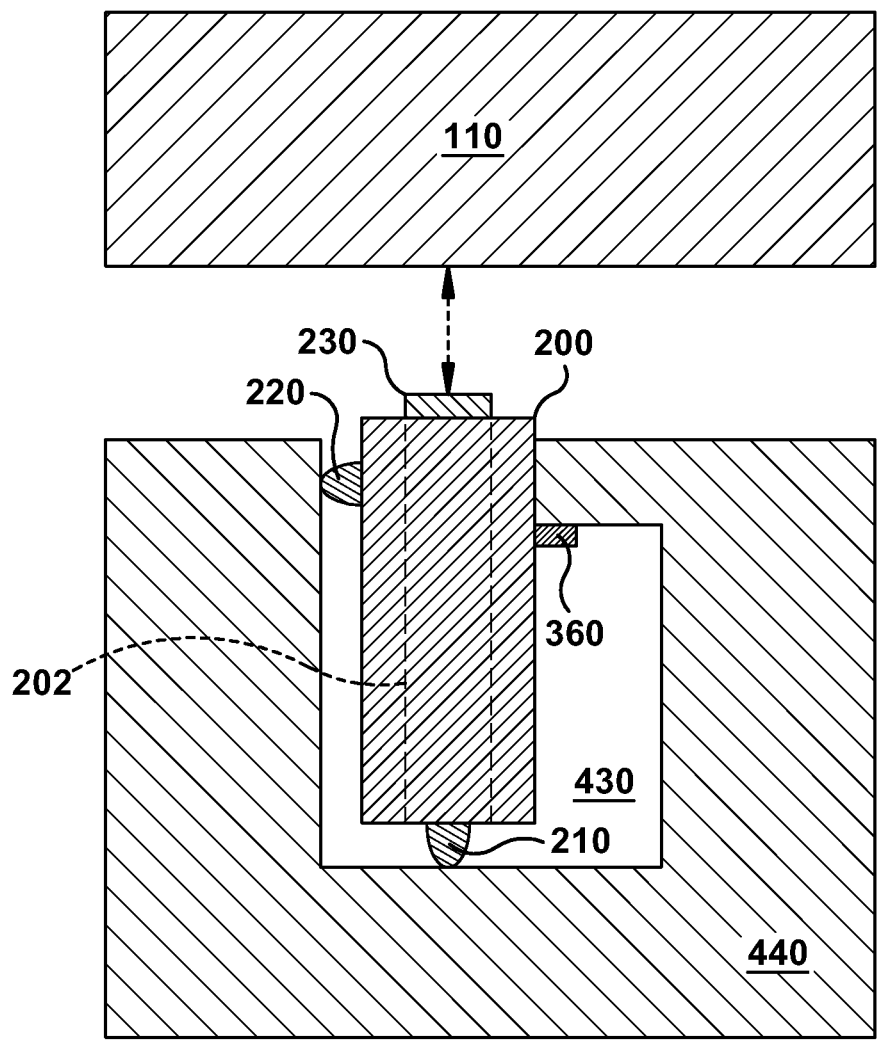
FIG. 4 illustrates a simplified cross-sectional view of the fixture placed substantially within a groove of a stator diaphragm, according to an aspect of the present invention.

FIG. 4 illustrates a simplified cross-sectional view of the fixture 200 placed substantially within groove 430 of stator diaphragm 440. The fixture 200 is supported against the interior walls of the groove 430 by pins 360 and spring elements 210 and 220. The sensor 230 is configured to measure the gap or distance between the end of sensor 230 and rotor 110. The fixture may be slid along the groove 430 and located in multiple positions for multiple readings.

According to an aspect of the present invention, a method for measuring concentricity between a first component (e.g., stator diaphragm 440) and a second component (e.g., rotor 110) is herein described. The first component 440 has an inner circumferential groove 430, and the method includes the steps of positioning a fixture 200 containing a sensor 230 substantially within the inner circumferential groove 430, obtaining a distance measurement from the sensor 230, the distance measurement relating to a distance between the sensor 230 and the second component 110. The positioning step and the obtaining step are repeated a predetermined number of times (e.g., one, two, three or more times), and a plurality of distance measurements obtained at different locations along the inner circumferential groove 430 are used to determine the concentricity of the first component 440 and the second component 110.

The different locations may be spaced apart from each other by about ninety degrees with respect to an origin of the inner circumferential groove 430. The positioning and repeating steps may include positioning the fixture in three or more locations along the inner circumferential groove. For example, three locations could be used and each of the three locations are approximately equally spaced along the inner circumferential groove. As a further example, a first location could be at a generally horizontal location (on one side) of the groove 430, a second location could be at a bottom location of the groove 430, and a third location could be at a generally horizontal location (on the opposing side) of the groove 430. However, it is to be understood that the different locations may be used to obtain readings all throughout the groove (or slot), at multiple locations equally or not-equally spaced, or any variation thereof.

The method may also include the steps of providing the fixture 200 with a first spring element 210 and a second spring element 220, the first spring element 210 configured to apply force in an orthogonal direction to the second spring element 220. An additional step may be used for adjusting a radial position of the sensor 230 by moving the sensor within the fixture 200. For example, all or a portion of internal passage may be threaded as well as an external surface of sensor 230. This configuration allows the sensor to be screwed up or down along internal passage 202, and allows for the control of the radial position of sensor 230 with respect to the stator diaphragm 440, groove 430 and/or rotor 110.

The method and system herein described could be used for any concentricity alignment where there are two cylinders with one inside the other, or a cylinder with a solid round rod in the center. As one non-limiting example only, the method and system herein described may be used to align packing casings which are not diaphragms but similarly need concentricity to the rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for measuring concentricity between a stator diaphragm and a rotor, the system comprising:
   a fixture having a first spring element and a second spring element, the first spring element configured to apply force in an orthogonal direction to the second spring element, the first spring element configured to apply force in a radial direction relative to the stator diaphragm, and the second spring element configured to apply force in an axial direction relative to the stator diaphragm, the first spring element and the second spring element are configured to contact inner surfaces of a groove in the stator diaphragm;
   a sensor mounted to the fixture, the sensor configured to measure a distance to the rotor; and
   wherein, the fixture is configured to slide substantially inside the groove of the stator diaphragm.

2. The system of claim 1, wherein each of the first spring element and the second spring element is comprised of two individual spring elements.

3. The system of claim 1, wherein the sensor is mounted to the fixture in a radially adjustable mount so that a radial position, relative to a surface of the stator diaphragm, of the sensor may be adjusted.

4. The system of claim 3, wherein the radially adjustable mount is comprised of a threaded interface between the sensor and the fixture.

5. The system of claim 1, the sensor further comprised of a non-contact sensor, the non-contact sensor chosen from at least one of:
   a laser distance sensor, a laser displacement sensor, an inductive distance sensor and an inductive displacement sensor.

6. The system of claim 1, the fixture further comprising:
   two pull attachment mounts, each pull attachment mount located on an opposing end of the fixture.

7. The system of claim 1, wherein a low friction material is disposed on a surface of the fixture that is generally opposed to at least one of the first spring element and the second spring element.

8. A method for measuring concentricity between a stator diaphragm and a rotor, the stator diaphragm having an inner circumferential groove, the method comprising the steps of:
   positioning a fixture containing a sensor substantially within the inner circumferential groove;
   adjusting a radial position of the sensor by moving the sensor within the fixture;
   obtaining a distance measurement from the sensor, the distance measurement relating to a distance between the sensor and the rotor;
   repeating the positioning step and the obtaining step a predetermined number of times;
   wherein a plurality of distance measurements obtained at different locations along the inner circumferential groove are used to determine the concentricity of the stator diaphragm and the rotor.

9. The method of claim 8, wherein the different locations are spaced apart from each other by about ninety degrees with respect to an origin of the inner circumferential groove.

10. The method of claim 8, wherein the positioning and repeating steps further comprise:
    positioning the fixture in three or more locations along the inner circumferential groove.

11. The method of claim 10, wherein three locations are used and each of the three locations are approximately equally spaced along the inner circumferential groove.

12. The method of claim 8, further comprising:
    providing the fixture with a first spring element and a second spring element, the first spring element configured to apply force in an orthogonal direction to the second spring element.

13. A method for measuring concentricity between a stator diaphragm and a rotor, the stator diaphragm having an inner circumferential groove, the method comprising the steps of:
    positioning a fixture containing a sensor substantially within the inner circumferential groove;
    obtaining a distance measurement from the sensor, the distance measurement relating to a distance between the sensor and the rotor;
    repeating the positioning step and the obtaining step a predetermined number of times;
    wherein a plurality of distance measurements obtained at different locations along the inner circumferential groove are used to determine the concentricity of the stator diaphragm and the rotor, and wherein the positioning and repeating steps further comprise positioning the fixture in three or more locations along the inner circumferential groove.

14. The method of claim 13, wherein the different locations are spaced apart from each other by about ninety degrees with respect to an origin of the inner circumferential groove.

15. The method of claim 13, further comprising:
    providing the fixture with a first spring element and a second spring element, the first spring element configured to apply force in an orthogonal direction to the second spring element.

16. The method of claim 8, the adjusting step further comprising:
    adjusting the sensor radially by screwing the sensor along a threaded passage in the fixture; and
    wherein the radially adjustable mount is comprised of a threaded interface between the sensor and the fixture.

17. The method of claim 13, further comprising:
    adjusting a radial position of the sensor by screwing the sensor along a threaded passage in the fixture; and
    wherein the radially adjustable mount is comprised of a threaded interface between the sensor and the fixture.

* * * * *

UNITED STATES PATENT AND TRADEMARK OFFICE
CERTIFICATE OF CORRECTION

PATENT NO.         : 8,869,416 B2
APPLICATION NO.    : 13/629759
DATED              : October 28, 2014
INVENTOR(S)        : Davidson et al.

It is certified that error appears in the above-identified patent and that said Letters Patent is hereby corrected as shown below:

On the Title Page

In Item (71), under "Applicant", in Column 1, Line 2, delete "Schenectadey," and insert -- Schenectady, --, therefor.

In Item (74), under "Attorney, Agent, or Firm", in Column 2, Line 2, delete "Cuswick;" and insert -- Cusick; --, therefor.

Signed and Sealed this
Third Day of January, 2017

Michelle K. Lee
*Director of the United States Patent and Trademark Office*